Jan. 29, 1957  S. D. LAPHAM  2,779,492
HAND TRUCK

Filed Sept. 1, 1950  5 Sheets-Sheet 1

INVENTOR.
SIDNEY D. LAPHAM
BY
Mellin and Hanscom
ATTORNEYS

Jan. 29, 1957 S. D. LAPHAM 2,779,492
HAND TRUCK
Filed Sept. 1, 1950 5 Sheets-Sheet 2

INVENTOR.
SIDNEY D. LAPHAM
BY
Mellin and Hanson
ATTORNEYS

Jan. 29, 1957  S. D. LAPHAM  2,779,492
HAND TRUCK
Filed Sept. 1, 1950  5 Sheets-Sheet 3
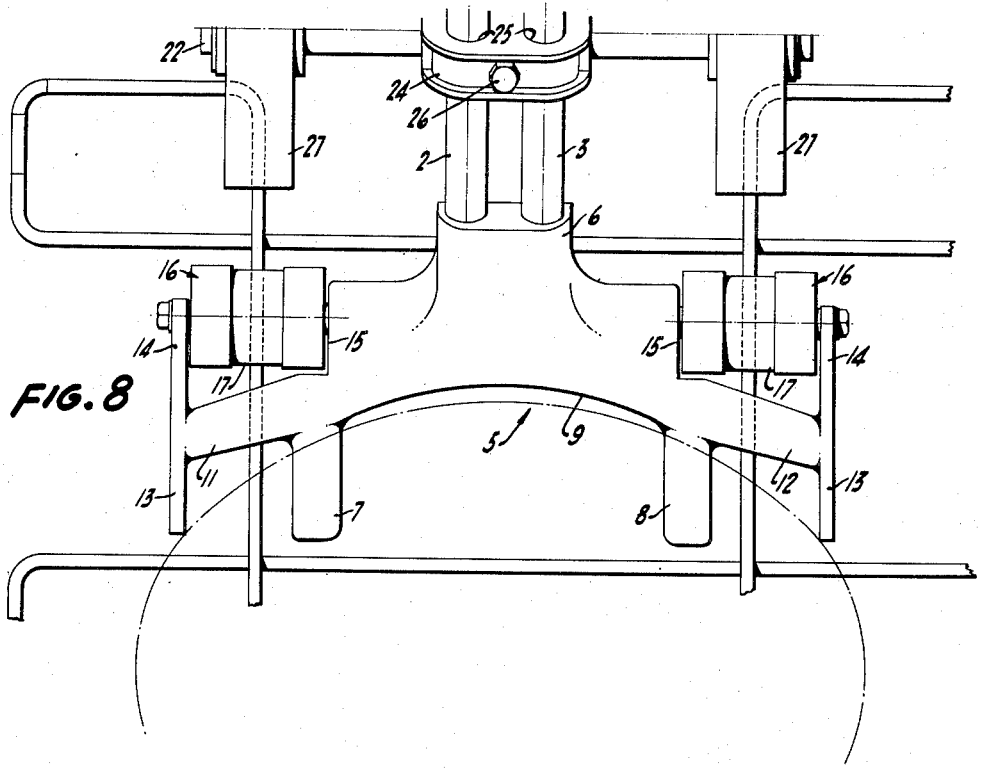
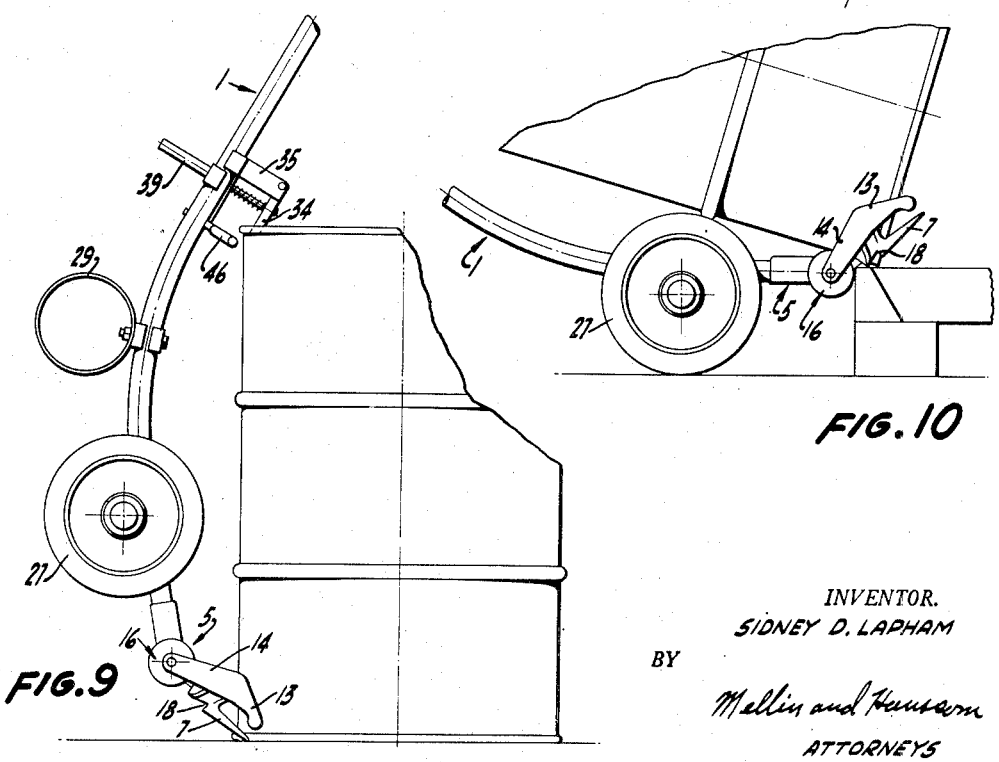
INVENTOR.
SIDNEY D. LAPHAM
BY
*Mellin and Hanson*
ATTORNEYS Jan. 29, 1957  S. D. LAPHAM  2,779,492
HAND TRUCK Filed Sept. 1, 1950  5 Sheets-Sheet 4

INVENTOR.
SIDNEY D. LAPHAM
BY
Mellin and Hanscom
ATTORNEYS

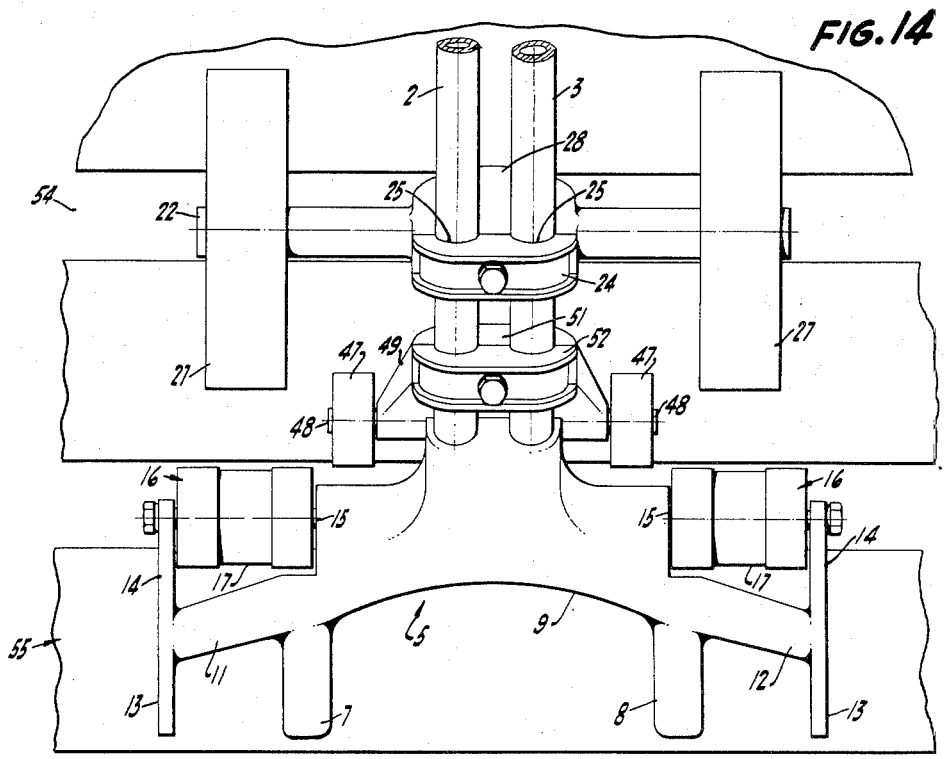

United States Patent Office 2,779,492
Patented Jan. 29, 1957

2,779,492

HAND TRUCK

Sidney D. Lapham, Martinez, Calif.

Application September 1, 1950, Serial No. 182,813

8 Claims. (Cl. 214—383)

This invention relates to hand trucks, and more particularly to hand trucks for transporting oil drums and the like and for manipulating such drums on and off platforms such as pallets and weighing scales.

Drums of the character involved loaded with oil or chemicals have a weight in the order of 500 to 1,000 pounds and their transport and manipulation within the confines of a plant or warehouse is always a serious problem.

In general, the object of this invention is the provision of a hand truck including a pair of parallel, closely spaced and downwardly bowed beams terminating at their upper ends in diverging handle bars, provided at their lower ends with a crosspiece or fork including forwardly extending, transversely spaced tines, and which serves as a frame on which other sub assemblies can be detachably mounted.

Extending laterally from the sides of the crosspiece or fork are shank extensions, and formed on the ends of these extensions are forwardly extending elevator levers and rearwardly extending brackets. Mounted between the shank and each of these brackets are grooved rollers particularly designed for manipulating the hand truck onto and from platforms, such as wooden pallets or steel strip skeleton pallets of the character disclosed in my copending application, Serial No. 785,040, filed November 10, 1947 and now Patent No. 2,662,710. Adjustably secured to the truck beams rearwardly of the crosspiece or fork are ground engaging wheels.

Slidably mounted on the beams forwardly of their handle bars is a chime hook arranged to lock over the upper chime of a barrel carried by the truck, the upper end of the barrel being supported by an arcuate cradle or saddle associated with the chime hook. The construction of the chime hook is such that the greater the load to which it is subjected, the more securely it is locked to the truck beams.

Also adjustably mounted on the beams between the ground engaging wheels and the chime hook is a downwardly extending ring serving as a truck manipulating member and support.

Optionally, a second set of rollers may be mounted on the truck beams intermediate the first set of rollers above mentioned and the ground engaging wheels, and which lie on centers inwardly of the centers of the ground engaging wheels.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 8 is a top plan view of the lower end of the truck, showing its cross member or fork in its operative relation with respect to a skeleton pallet of the type shown in my co-pending application, Serial No. 785,040, above referred to.

Fig. 9 is a side view of the truck as shown in its initial position when picking up an oil drum.

Fig. 10 is a fragmentary view of the lower end of my truck, carrying an oil drum and in its initial position when manipulating the drum onto a skeleton pallet of the type above referred to.

Fig. 13 is a side elevation of my truck similar to the view shown in Fig. 12 but illustrating its use in elevating an oil drum onto a pair of weighing scales provided with a special bed of a construction similar to the skeleton pallet referred to.

Fig. 14 is a top plan view of a hand truck of the character above described but which is provided with an auxiliary set of rollers and is shown in its operative position over a standard wooden pallet.

Fig. 15 is a side elevation of the truck shown in Fig. 14, but with the gear ground-engaging wheel broken away to better illustrate the construction of the device.

Figures 1, 2:
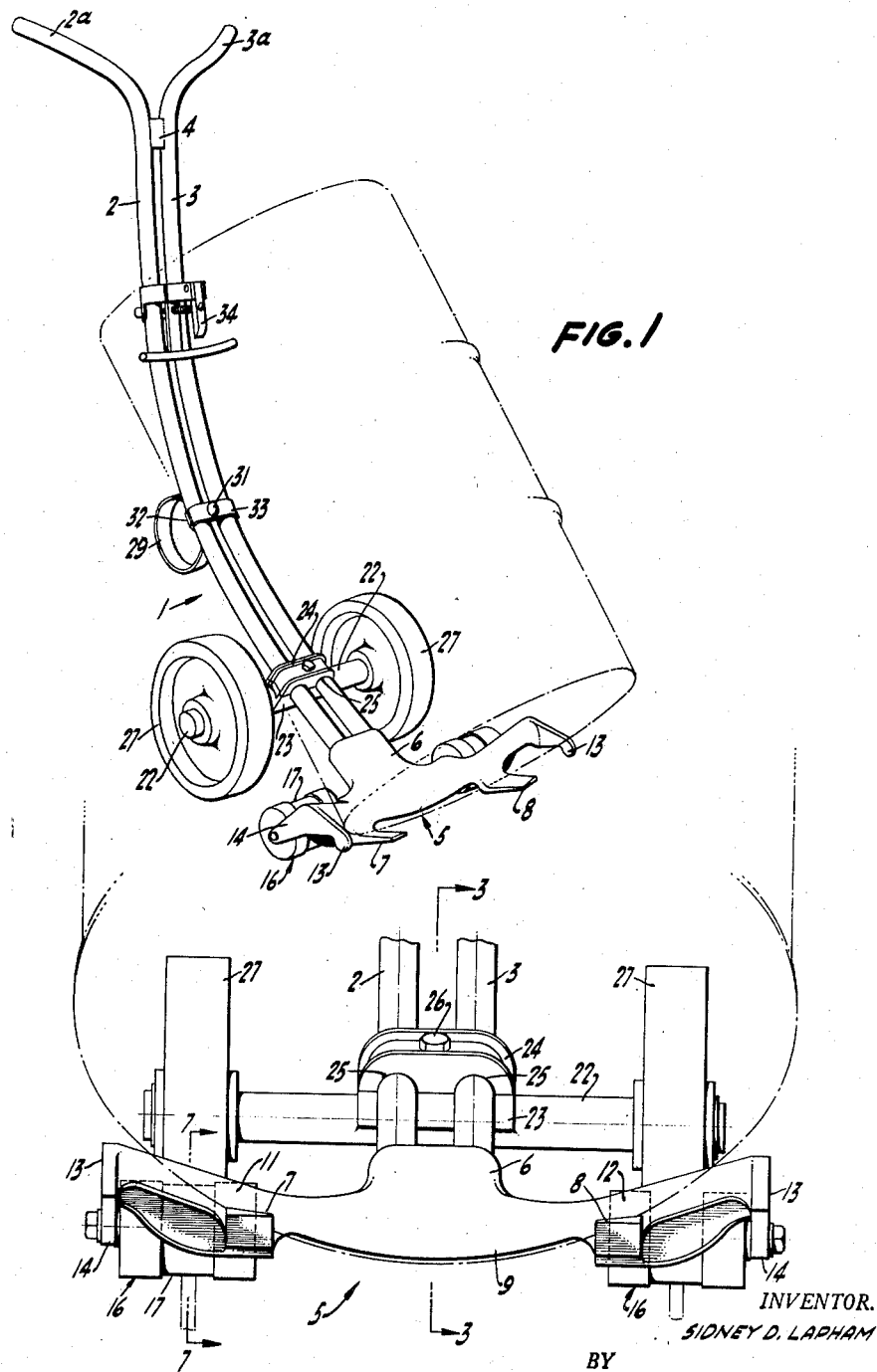
Fig. 1 is a perspective view of a barrel truck embodying the objects of my invention, an oil drum being shown in dot-dash line in its operative position relative to the truck.
Fig. 2 is a front elevation of the crosspiece or fork shown in Fig. 1, and including the ground engaging wheels and the lower ends of its bowed beams.

The truck shown in these drawings comprises a frame assembly generally designated by the reference numeral 1 and including a pair of parallel, downwardly bowed beams 2 and 3 preferably made of structural steel tubing held in closely spaced relation adjacent their upper ends by a spacer 4 welded thereto and bent outwardly at their upper ends to form handle bars 2a and 3a. The lower ends of the beams 2 and 3 are receivable and welded in a pair of transversely spaced sockets formed in a crosspiece, head or fork generally designated by the reference numeral 5 and including a shank 6 and a pair of transversely spaced, forwardly extending tines 7 and 8 said tines, as clearly illustrated in Figures 1 and 2, being disposed inwardly of the ends of the shank. The fork 5 and beams 2 and 3 therefore serve as an integral structure wherein the beams define a relatively narrow central channel and serve as a convenient and effective means for adjustably mounting auxiliary sub assemblies to the truck.

As illustrated in Figs. 1, 2, 8 and 14, the forward edge 9 of the fork shank 6 is of arcuate form and serves as a cradle for receiving the lower chime of a drum or barrel while it is supported on the tines 7 and 8.

Figure 3:
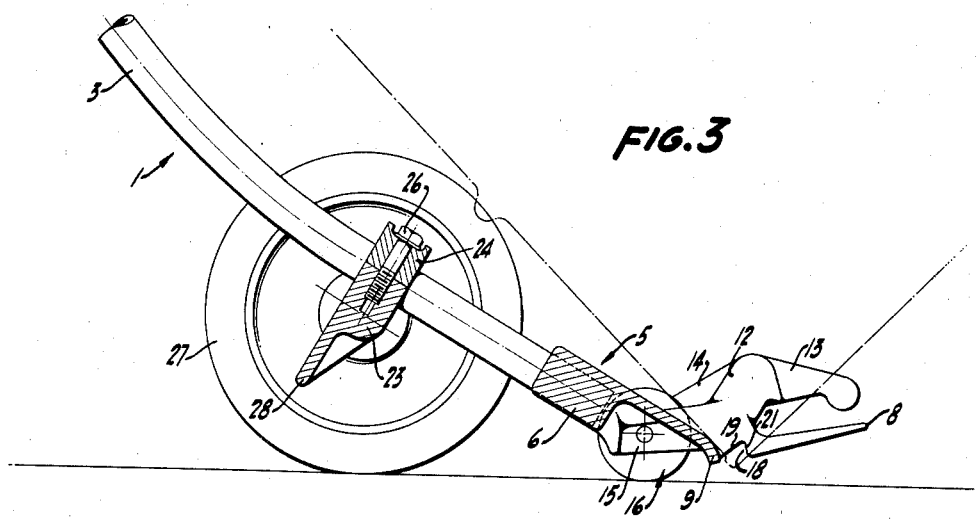
Fig. 3 is a vertical mid-section of the lower portion of the truck taken on the line 3—3 of Fig. 2.
Figure 4:
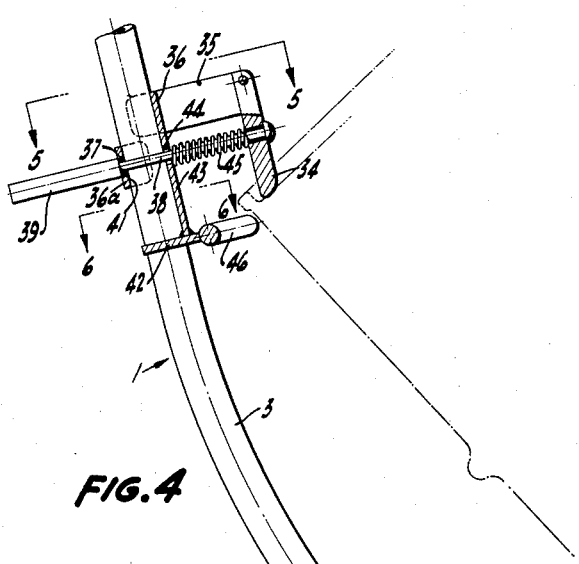
Fig. 4 is a vertical mid-section of the upper half of the truck, illustrating the chime hook and wherein an oil drum has been indicated in dot-dash line in its operative position relative to the truck.
Figure 5:
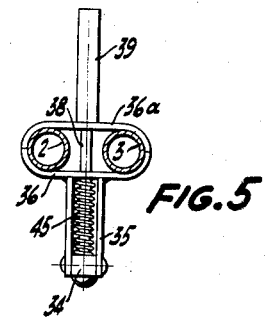
Fig. 5 is a sectional detail taken on the line 5—5 of Fig. 4.
Figure 6:
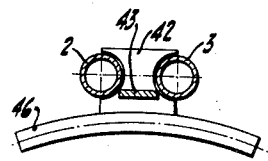
Fig. 6 is a detail section taken on the line 6—6 of Fig. 4.
Figure 7:
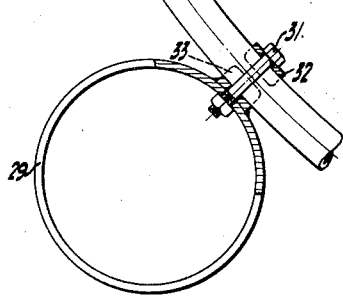
Fig. 7 is a cross section of the crosspiece or fork taken on the section line 7—7 of Fig. 2.

Preferably the crosspiece or shank 6 is made in the form of a steel casting having a cored under-surface as best illustrated in Figs. 2, 3 and 7. Formed integral with the shank 6 are lateral extensions 11 and 12, each provided with a forwardly extending lever or elevator 13 and with a rearwardly extending bearing bracket 14. Preferably the outer ends of the elevators 13 lie somewhat above the plane determined by the fork tines 7 and 8. Journaled to and between the brackets 14 and shoulders 15 formed in the shank 6 are a pair of solid alloy steel rollers 16, each provided with a central groove 17 and each being substantially tangent with the plane determined by the lower faces of the tines 7 and 8. Formed on each of the heels of tines 7 and 8 is a notch 18 defined by a forwardly inclined wall 19 and a front wall or shoulder 21 formed at right angles with the lower surface of its tine. As illustrated in the drawings, the notches 18 serve as pallet grips when manipulating the truck onto a standard wooden pallet.

In this connection, it should be observed that standard oil drums have a diameter of about 23½ inches. This dimension determines the spacing of the tines 7 and 8, for the tines must pass between two adjacent rails of the skeleton pallet above referred to and these rolls are spaced so as to support a drum in stable equilibrium. Briefly, a pallet of this type consists of a lower set of four parallel steel strip rails welded at right angles to an upper identical set of four parallel steel strip rails in edge-to-edge relation so as to form a symmetrical grid structure. Each pair of rails is so spaced that when an oil drum is supported thereon, it will be in stable equilibrium when either in a vertical position or in a horizontal position. When the drum is in a horizontal position, the two adjacent rails serve as a cradle therefor. As a result of this construction, it is possible to load and unload the pallet by means of a fork lift truck as well as to pick up the loaded pallet on a lift truck.

Adjustably mounted on the beams 2 and 3 is a cast alloy steel axle 22 provided with a central pillow block 23. Disposed over the pillow block 23 is a clamp 24 provided with sockets 25 complementary to the beams 2 and 3, the pillow block and clamp being held in clamping engagement with the beams by a bolt 26. Journaled on the ends of the axle 22 are rubber-tired ground engaging wheels 27 located in substantial alignment with the grooves 17 formed in the rollers 16. Formed as an integral part of the axle 22 is a downwardly extending, centrally located foot pedal 28 for aiding in manipulating the truck. Preferably, the axle 22 is located at a substantial distance rearwardly of the crosspiece or fork 6 to the end that a substantial proportion of the weight of a drum supported on the truck will be carried forwardly of the axle. The purpose of this is twofold. In the first place, it decreases the load required to be supported by the operator and, in the second place, it makes it possible to elevate the forward end of the head-piece or fork of the truck to a height sufficient to enable the elevators 13 to be hooked over the edge of a skeleton pallet or other platform.

Adjustably mounted on the beams 2 and 3 rearwardly of the ground engaging wheels 27 is a metal ring 29 provided with a bolt hole for the reception of a bolt 31. The ring 29 is adjustably secured to the beams 2 and 3 by upper and lower clamps 32 and 33 provided with registering holes for the reception of the bolt 31 and serves the dual function of an auxiliary foot lever for assisting in "breaking over" a loaded truck and for retracting the tines 7 and 8 from beneath the lower end of a drum when the drum is supported on end on either a pallet or on the floor.

Mounted between the ring 29 and the spacer 4 is a downwardly extending, spring-biased chime hook 34. The upper end of the hook 34 is pivoted to a bifurcated bracket 35 welded to an upper clamp 36 straddling the beams 2 and 3. Similarly straddling the lower sides of the beams 2 and 3 is a lower clamp 36a provided with a hole 37 for the reception of a pin 38. Formed integral with the pin 38 and as a downward extension thereof is a hand grip 39 provided with a shoulder 41 at its upper end for limiting the outward movement of the pin 38. Slidable between the beams 2 and 3 and formed with arcuate sides complementary to the beams is a slide 42. Welded to the slide 42 and extending upwardly therefrom is a bracket 43 provided with a hole 44 for the free reception of the pin 38. Mounted on the pin 38 is a spring 45 serving to bias the two clamps 36 and 36a into resilient clamping engagement with the beams 2 and 3. Welded to the slide 42 on the upper end thereof is an arcuate cross member or cradle 46 for the accommodation of the upper end of a drum supported on the truck.

From an inspection of Fig. 9, it will be noted that when "breaking over" a drum from its upright position onto the truck, the lower end of the chime hook 34 will be pulled outwardly and that this, in turn, results in more tightly engaging the clamps 36 and 36a about the beams 2 and 3. As the drum is inclined more and more toward the operator, the load on the chime hook 34 will be decreased and the pressure on the clamp will be relieved, thereby permitting the chime hook assembly to move upwardly as the tines 7 and 8 of the fork 6 are moved beneath the bottom of the drum. The biasing action of the spring 45 is merely sufficient to lightly hold the hook in any adjusted position.

When used in manipulating drums onto and from a wooden pallet, the truck is preferably provided with a pair of auxiliary rollers 47 mounted between the rollers 16 and the ground engaging wheels 27 and inwardly thereof as illustrated in Figs. 14 and 15. The rollers 47 are journaled on stub shafts 48 formed integral with a downwardly and forwardly extending cast alloy steel bracket 49 and pillow block 51. The pillow block 51 is clamped to the beams 2 and 3 by a clamp 52 provided with beam seats on its lower face and with a bolt hole for the reception of the bolt 53 extending therethrough and threaded to the pillow block.

From the above description, it will be seen that basically my truck consists of a pair of parallel, downwardly bowed and closely spaced beams formed integrally at its lower end with a crosspiece, head member or fork, the beams serving as a frame on which the wheel assembly, roller assembly, ring assembly and chime hook assembly can be adjustably mounted by means of simple, conventional clamps without the necessity of resorting to additional structural members. The bow in the beams 2 and 3 is such that when a truck is loaded with a drum and in its carrying position, the entire system, that is, the truck plus its load, is in substantial equilibrium, thereby requiring the operator to support only a minimum of the load. Since the ground engaging wheels 27 are located substantially to the rear of the head-piece or fork 5, that portion of the truck forward of the wheels functions as a lever weighted by the fork and roller assemblies and serving to balance the loaded system. Furthermore, the location of the ground engaging wheels 27 can be readily adjusted to suit the type of load being handled. As shown in Fig. 8, a hand truck of the character above disclosed is being used in conjunction with a skeleton pallet such as above described with the grooves 17 of the rollers 16 supported on two adjacent pallet rails and with the ground engaging wheels 27 tracking with the rollers 16.

Normally, and as indicated in Figs. 14 and 15, there are cracks 54 in the deck 55 of a standard wooden pallet. In traversing such a deck, either the ground engaging wheels 27 or the forward rollers 16, or both of them, may enter the cracks and thus make the further manipulation of the truck extremely difficult. It is therefore essential for this use that the truck be provided with the auxiliary set of the laterally offset rollers 47 and which serve to support the truck between adjacent cracks 54.

Figure 11:
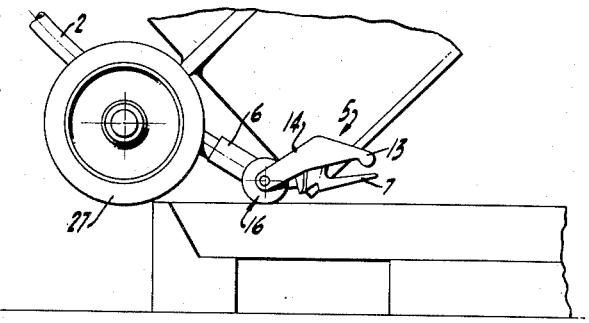
Fig. 11 is a side view of the lower end of my truck, carrying a barrel and shown just after the truck and its load have been elevated onto a skeleton pallet.
Figure 13:
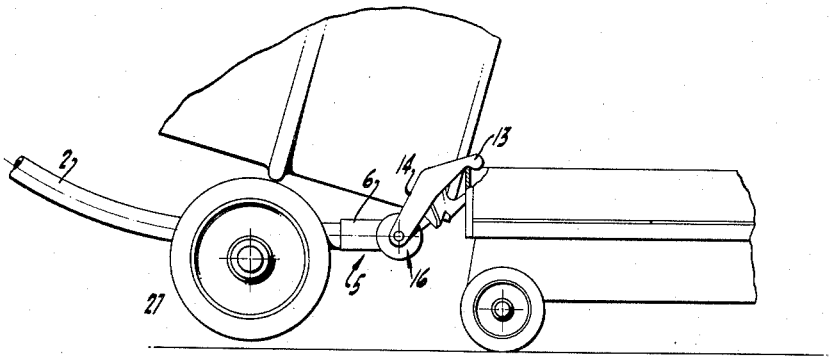

In so far as I am aware, there has been no attempt in the past to manipulate a drum onto and from a platform such as a pallet by means of a truck, this operation normally being considered as a hand operation requiring considerable strength and skill on the part of the operator and often resulting in injury to the pallet. However, as indicated in Fig. 13, the levers or elevators 13 make it possible for a drum to be elevated to a platform by lowering the handle bars of the truck to elevate the elevators 13 to a position over the lip of the weighing scales or one of the side rails of the pallet. With the elevators in this position, the truck then becomes a second class lever by which the drum can be lifted to its upright position supported by the weighing scales or the pallet. The intermediate portions of the elevators function as skids which can be made to slide over the lip of the scales or the skeleton pallet until, as shown in Fig. 11, the rollers 16 come into contact with the rails of the pallet or the scales. From this position, the drum can be properly located on the pallet or scales and then uprighted. When discharging a drum from a platform of this character, the reverse operation can be resorted to.

Figure 12:
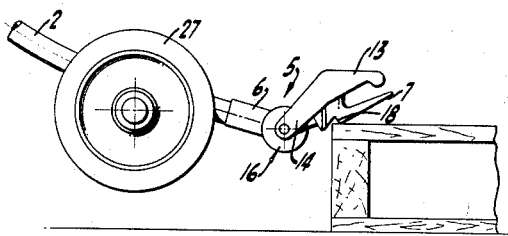
Fig. 12 is a view similar to Fig. 10 but showing the truck being elevated onto a standard wooden pallet.

If it is desired to mount a drum onto a wooden pallet of standard construction and which is not provided with a lip or side rails, resort is had to the notches 18 formed in the heels of the tines 7 and 8, this operation being illustrated in Fig. 12. Here again the handle bars of the truck are lowered to elevate the fork assembly until the upper corner of the pallet is engaged in the notches 18. In this position, the truck constitutes a second class lever by which the drum can be elevated onto the platform and then, as illustrated in Figs. 14 and 15, trundled over the pallet into proper position and discharged thereon in a vertical position.

In all of these operations the foot pedal 28 and the ring 29 of course come into play and are used when desired.

I claim:

1. A hand truck comprising: a downwardly bowed beam provided at its upper end with diverging handle bars and at its lower end with a fork including a shank having an arcuate forward edge and transversely spaced, forwardly extending tines; forwardly extending elevator levers formed integral with said shank, the outer ends of said levers lying on a plane substantially above the plane determined by the tines of said fork; and ground engaging wheels mounted on said beam substantially rearwardly of said fork.

2. A hand truck comprising: a downwardly bowed beam provided at its upper end with diverging handle bars and at its lower end with a fork including a shank having an arcuate forward edge serving as a drum cradle and provided with transversely spaced forwardly extending tines, the heels of said tines being notched for the accommodation of the lip of a pallet or other platform; and ground engaging wheels mounted on said beam substantially rearwardly of said fork.

3. A hand truck comprising: a pair of parallel closely spaced, downwardly bowed beams, said beams being divergent at their upper ends to form hand grips and provided at their lower ends with a fork including a shank and transversely spaced, forwardly extending coplanar tines; lateral extensions formed integral with said shank, the ends of said extensions being provided with rearwardly extending brackets and forwardly extending elevator levers; grooved rollers mounted to and between each of said brackets and said shank; ground engaging wheels mounted on said beams substantially rearwardly of said fork and in alignment with said grooved rollers; and auxiliary rollers mounted on said beams between said grooved rollers and said ground engaging wheels, said auxiliary rollers lying inwardly with respect to said ground engaging wheels and grooved rollers.

4. A hand truck comprising: a pair of parallel, longitudinally arcuate beams secured together adjacent their ends in closely spaced relation and forming a central channel, the upper ends of said beams being divergently bent to form a pair of handle bars; a first clamp member disposed transversely over the rear faces of said beams; a second clamp member disposed transversely over the front faces of said beams, said second clamp member being provided with an outwardly extending bracket; a hook pivoted to said bracket; a pin extending freely through an aperture formed in said hook, through said channel and through an aperture formed in said first clamp member; a spring disposed between said hook and said beams for resiliently urging said hook outwardly and urging said clamp member into engagement with said beams; a fork mounted on the lower ends of said beams, said fork including a transversely arcuate shank serving as a drum cradle and transversely spaced, forwardly extending tines, said tines being disposed inwardly of the ends of said shank; and ground engaging wheels mounted on said beams rearwardly of said fork.

5. A hand truck comprising: a pair of parallel, longitudinally arcuate beams secured together adjacent their ends in closely spaced relation and forming a central channel, the upper ends of said beams being divergently bent to form a pair of handle bars; a first clamp member disposed transversely over the rear faces of said beams; a second clamp member disposed transversely over the front faces of said beams, said second clamp member being provided with an outwardly extending bracket; a hook pivoted to said bracket; a pin extending freely through an aperture formed in said hook, through said channel and through an aperture formed in said first clamp member; a spring disposed between said hook and said beams for resiliently urging said hook outwardly and urging said clamp members into engagement with said beams; a fork mounted on the lower ends of said beams, said fork including a transversely arcuate shank serving as a drum cradle and transversely spaced, forward extending tines; a lateral extension formed on each end of said shank, each of said extensions being provided with a forwardly extending elevator lever disposed above the plane determined by said tines; and ground engaging wheels mounted on said beams to the rear of said fork.

6. A hand truck comprising: a pair of parallel, longitudinally arcuate beams secured together adjacent their ends in closely spaced relation and forming a central channel, the upper ends of said beams being divergently bent to form a pair of handle bars; a first clamp member disposed transversely over the rear faces of said beams; a second clamp member disposed transversely over the front faces of said beams, said second clamp member being provided with an outwardly extending bracket; a hook pivoted to said bracket; a pin extending freely through an aperture formed in said hook, through said channel and through an aperture formed in said first clamp member; a spring disposed between said hook and said beams for resiliently urging said hook outwardly and urging said clamp members into engagement with said beam; a fork mounted on the lower ends of said beams, said fork including a transversely arcuate shank serving as a drum cradle and transversely spaced, forwardly extending tines; a lateral extension formed on each end of said shank, each of said extensions being provided with a rearwardly extending bracket; a roller mounted between each of said brackets and said shank, said rollers being substantially tangent with the plane determined by the lower faces of said tines; and ground engaging wheels mounted on said beams rearwardly of said fork.

7. A hand truck comprising: a pair of parallel, longitudinally arcuate beams secured together adjacent their ends in closely spaced relation and forming a central channel, the upper ends of said beams being divergently bent to form a pair of handle bars; a first clamp member disposed transversely over the rear faces of said beams; a second clamp member disposed transversely over the front faces of said beams, said second clamp member being provided with an outwardly extending bracket; a hook pivoted to said bracket; a pin extending freely through an aperture formed in said hook, through said channel and through an aperture formed in said first clamp member; a spring disposed between said hook and said beams for resiliently urging said hook outwardly and urging said clamp members into engagement with said beams; a fork mounted on the lower ends of said beams, said fork including a transversely arcuate shank serving as a drum cradle and transversely spaced, forwardly extending tines; a lateral extension formed on each end of said shank, each of said extensions being provided with a forwardly extending elevator lever disposed above the plane determined by said tines and a rearwardly extending bracket; a roller mounted to and between each of said brackets and said shank, said rollers being substantially tangent with the plane determined by the lower faces of said tines; and ground engaging wheels mounted on said beams rearwardly of said fork.

8. A hand truck comprising: a pair of parallel, longitudinally arcuate beams secured together adjacent their ends in closely spaced relation and forming a central channel, the upper ends of said beams being divergently bent to form a pair of handle bars; a first clamp member disposed transversely over the rear faces of said beams; a second clamp member disposed transversely over the front faces of said beams, said second clamp member being provided with an outwardly extending bracket; a hook pivoted to said bracket; a pin extending freely through an aperture formed in said hook, through said channel and through an aperture formed in said first clamp member; a spring disposed between said hook and said beams for resiliently urging said hook outwardly and urging said clamp members into engagement with said beams; a fork mounted on the lower ends of said beams, said fork including a transversely arcuate shank serving as a drum cradle and transversely spaced, forwardly extending tines, each of said tines being formed on its lower face with a transverse upwardly extending notch; and ground engaging wheels mounted on said beams rearwardly of said fork.

References Cited in the file of this patent
UNITED STATES PATENTS

| | | |
|---|---|---|
| 322,150 | Barrows | July 14, 1885 |
| 1,429,918 | Allen | Sept. 26, 1922 |
| 1,442,560 | Fahrney | Jan. 16, 1923 |
| 1,615,919 | Sheldon | Feb. 1, 1927 |
| 2,346,649 | Bilek et al. | Apr. 18, 1944 |
| 2,385,514 | Hawkins | Sept. 25, 1945 |
| 2,447,300 | Williams | Aug. 17, 1948 |
| 2,541,613 | Roe | Feb. 13, 1951 |

FOREIGN PATENTS

| | | |
|---|---|---|
| 124,981 | Great Britain | Apr. 10, 1919 |
| 609,375 | Great Britain | Sept. 29, 1948 |